April 3, 1962　　　J. R. BOS ET AL　　　3,028,108
WIRING MACHINE
Filed June 7, 1957　　　　　　　　　　　　5 Sheets-Sheet 1

INVENTORS:
JOHN R. BOS
ROBERT B. SHULTERS

BY
ATTORNEY

April 3, 1962   J. R. BOS ET AL   3,028,108
WIRING MACHINE

Filed June 7, 1957   5 Sheets-Sheet 3

INVENTORS:
JOHN R. BOS
ROBERT B. SHULTERS

BY *Charles W. Walter*
ATTORNEY

April 3, 1962 J. R. BOS ET AL 3,028,108
WIRING MACHINE
Filed June 7, 1957 5 Sheets-Sheet 4
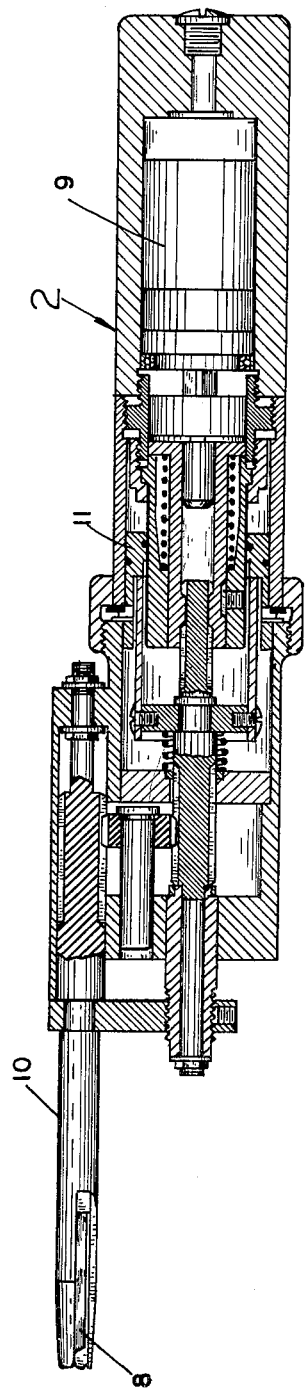
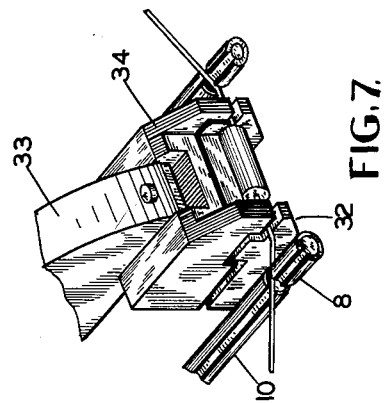
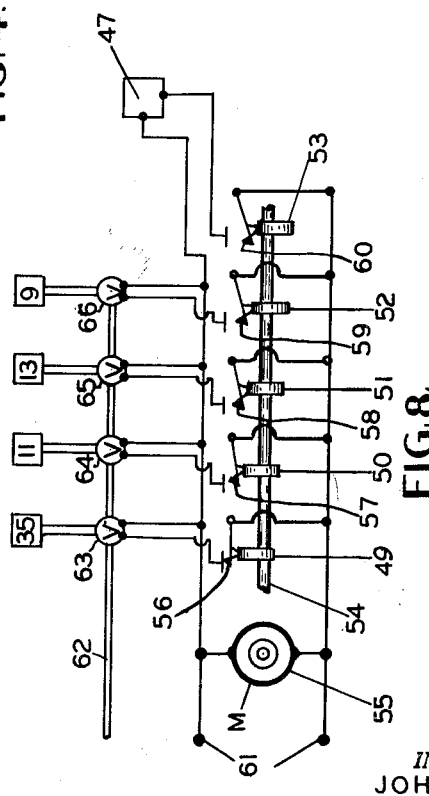
INVENTORS:
JOHN R. BOS
ROBERT B. SHULTERS
BY
*Charles W. Walton*
ATTORNEY April 3, 1962   J. R. BOS ET AL   3,028,108
WIRING MACHINE Filed June 7, 1957   5 Sheets-Sheet 5

INVENTORS:
JOHN R. BOS
ROBERT B. SHULTERS

BY *Charles W. Welton*
ATTORNEY 3,028,103
WIRING MACHINE
John R. Bos, Grand Haven, and Robert B. Shulters, Spring Lake, Mich., assignors to Gardner-Denver Company, Quincy, Ill., a corporation of Delaware
Filed June 7, 1957, Ser. No. 664,422
7 Claims. (Cl. 242—7)

This invention relates to machines for making electrical connections and more particularly to automatic or semi-automatic machines for making solderless wrapped connections of an electrical element to a terminal.

As disclosed in the patent to Hickman et al., No. 2,585,010 issued February 12, 1952, the satisfactory electrical connection of a prepared or preskinned wire to a terminal may be made with a hand tool which wraps the wire about the terminal. As disclosed by Hickman et al., it is necessary to insert the wire to be wrapped into the end of the tool requiring considerable manual manipulation of the wire and the wrapping tool.

The copending application of John R. Bos and Robert B. Shulters, Serial No. 501,967 filed April 18, 1955, now Patent No. 3,006,563, discloses a bit and sleeve construction for wrapping tools in which insertion of the wire is facilitated by means of a mechanical operation for positioning the wire in the tool. The machine to be described hereafter utilizes wrapping bits of this latter type so that automatic wiring of lengths of wire or of axial lead type elements may be accomplished.

Accordingly, it is an object of this invention to provide a machine for joining wires to terminals wherein the connections require no soldering or further operation.

A more specific object is to provide a machine for simultaneously joining the ends of a length of wire or of axial lead elements such as resistors, diodes, and capacitors to a pair of terminals.

A further object of this invention is to provide means for the automatic operation of a wiring machine including an element feed mechanism and a terminal or work piece feeding and positioning device.

Further objects and purposes of this invention will become apparent from the following specification and accompanying drawings in which:

FIG. 4 is a top view in section through one of the wrapping tools 2 of FIG. 1;

FIG. 7 is a perspective view of the forward portions of the gripping jaws shown in FIGS. 1, 2, 3, 5, and 6; and FIG. 8 is a wiring diagram of the machine illustrated in FIGS. 1-6.

Figure 1:
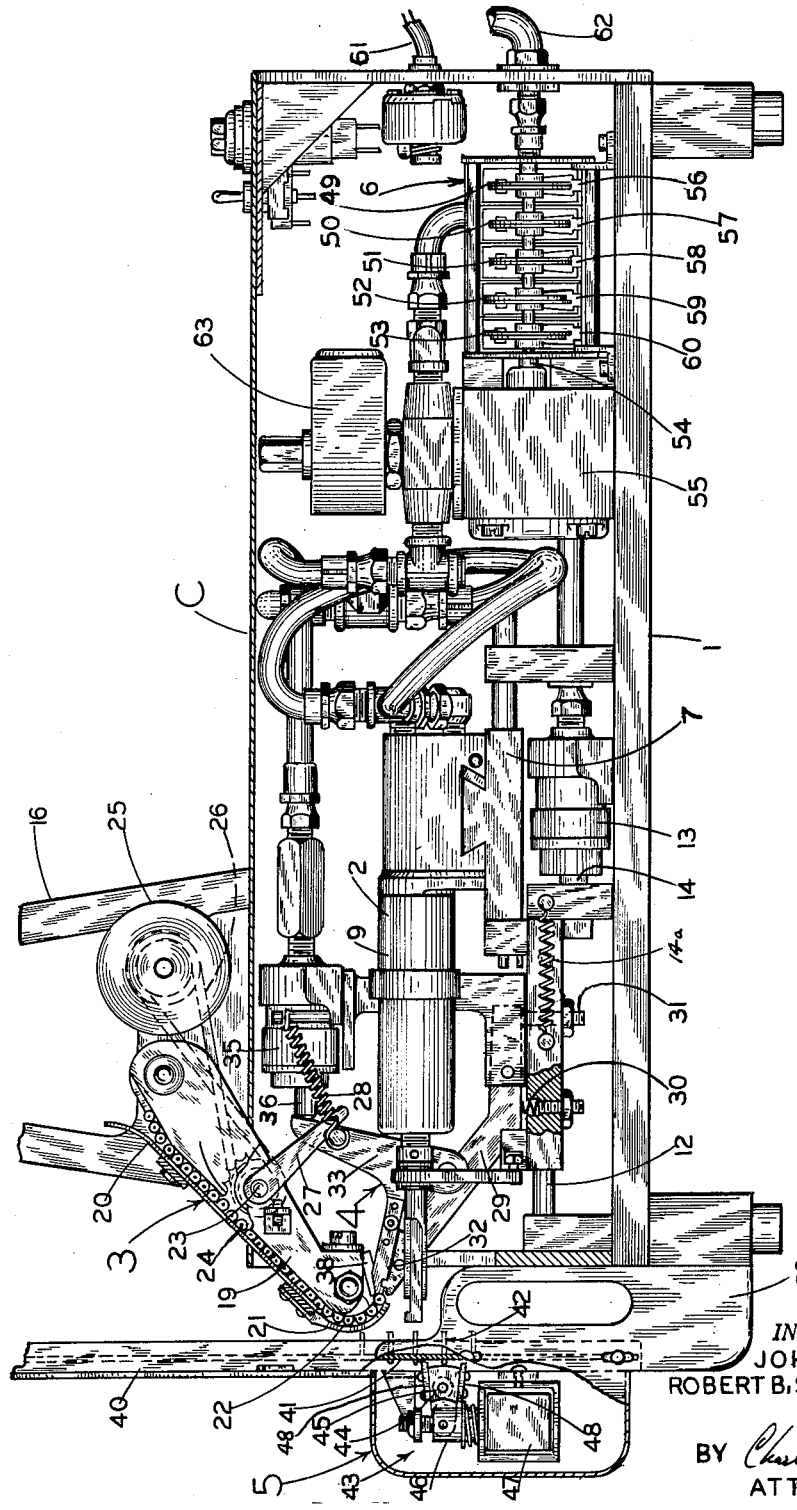
FIG. 1 is a side elevational view of a wiring machine in accordance with this invention.
Figure 2:
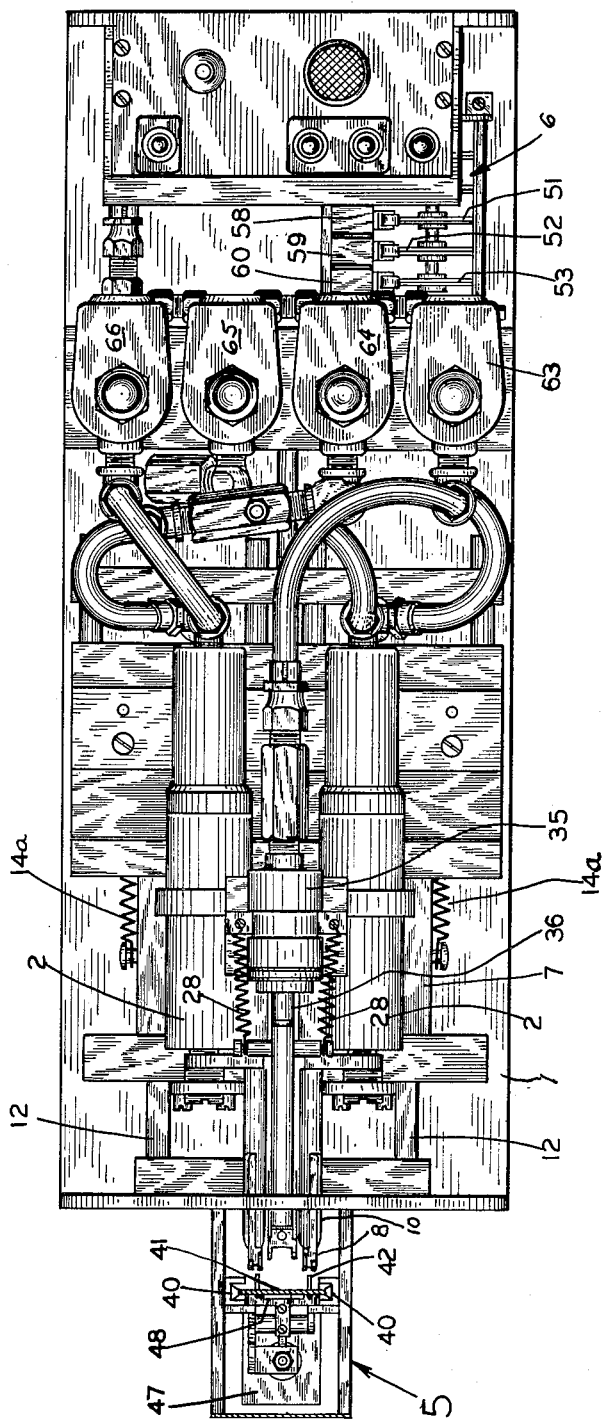
FIG. 2 is a top elevational view of the wiring machine of FIG. 1 with component feed mechanism and cover C removed.
Figure 3:
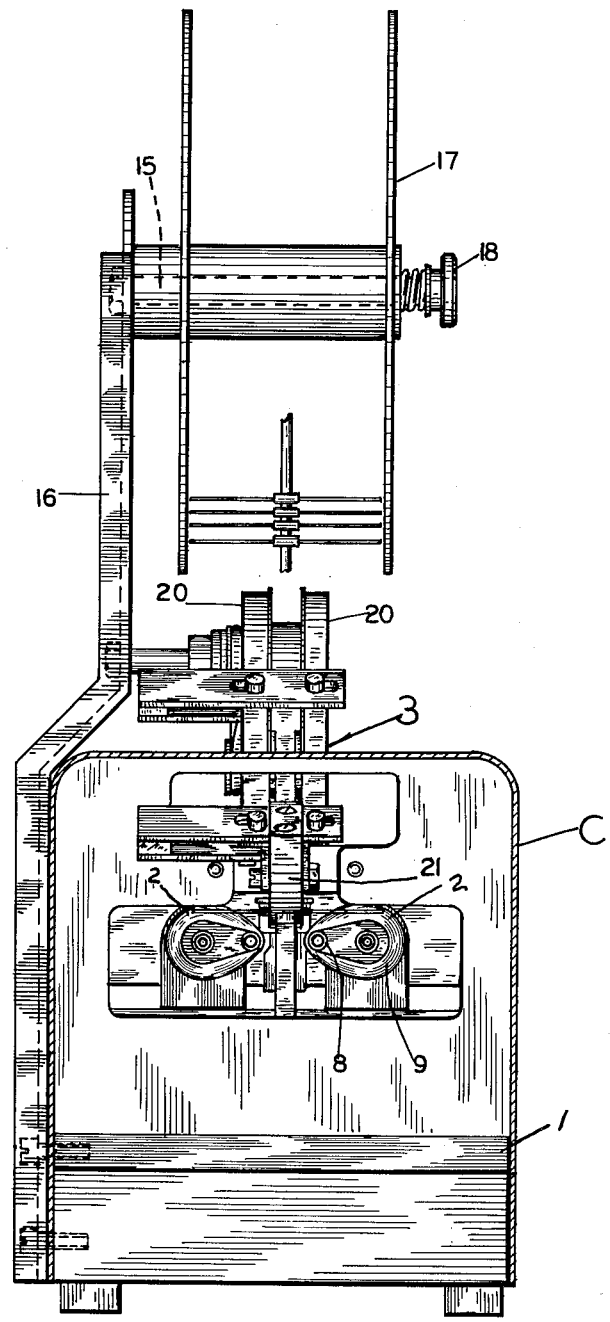
FIG. 3 is a front elevational view of the wiring machine of FIGS. 1 and 2 with fixture 5 removed.

As shown in FIGS. 1 and 2, the wiring machine which is the subject of this invention comprises a base 1 having a pair of wire wrapping tools 2 mounted thereon for horizontal movement with respect to said base. A cover C encloses the greater portion of the machine. A feed mechanism generally indicated at 3 is supported by the base and includes a transfer mechanism 4 adapted to feed electrical elements to the wrapping tools. A fixture 5 is mounted on one end of the base 1 for feeding and positioning a specific work piece to which the electrical elements are to be joined. Cam means 6 also mounted on the base control the operation of the various elements of the machine.

Wrapping Tools

The wire wrapping tools 2 are mounted in adjustable spaced and parallel relation to each other on a sliding platform 7. The wrapping tools (FIG. 4) include rotatable bits 8 driven in opposite rotational directions by sliding vane type rotary air motors which are contained within cylinders 9. The bits have axial bores in one end thereof to receive terminals on which an electrical element is to be wrapped. Sleeves 10, mounted for relative longitudinal movement with respect to the bits 8, cooperate with the bits to bend the leads of the electrical elements rearwardly at right angles to position or load the leads on the bits to perform the wire wrapping operation. The specific structure of the bits and sleeves employed is specifically described and claimed in the copending application Serial No. 501,967 hereinbefore mentioned. The sleeves 10 are movable axially with respect to the bits 8 by pneumatic pistons 11 within the housings of the tools as shown in FIG. 4. The operation of the tools 2 is more fully described and claimed in the copending application of John R. Bos and Robert B. Shulters, Serial No. 550,029 filed November 30, 1955, which has since matured as U.S. Patent 2,884,685, the only major structural difference being that the bit 8 is off-set in the present embodiment of the tools. As the specific form of the wrapping tools is not claimed herein, they will not be described in detail.

The sliding platform 7 on which the wrapping tools 2 are mounted is slidable with respect to base 1 on a pair of tubular ways 12. Forward movement of the platform and wrapping tools is effected by a pneumatic cylinder 13 having a stem 14 projecting therefrom to engage the platform 7, whereby to move the platform to position the wrapping bits 8 to receive within their bores the projecting terminals of a work piece supported on the fixture 5. Tension springs 14a serve to return the platform 7 when the work cycle of the machine is completed and the source of air pressure to cylinder 13 is interrupted, as will be more fully described hereafter.

Feed Mechanism

The feed mechanism 3, as shown on the drawings, is adapted to feed a supply of electrical elements from a reel pack to the wrapping tools. Electrical elements of the axial lead type are supplied by the manufacturers thereof in strip packages and reel packs. A reel pack consists of a length of adhesive tape to which the element bodies are removably attached. The tape with elements attached is then wound upon a spool to present a compact package of components. The machine herein described is provided with a rotatable spindle 15 supported above the wrapping tools 2 by a support member 16. The spindle 15 is adapted to receive a reel pack of elements 17 which is retained on the spindle for rotational movement. A spring biased retaining screw 18 serves to place a drag on the rotation of the reel pack 17.

The free end of the tape, to which the components are attached in the reel pack, is threaded into a stripping assembly consisting of a frame 19 with a pair of guide plates 20 connected thereto. The guide plates 20 are spaced from each other a sufficient distance to receive therebetween an element body, and are spaced from the frame 19 a sufficient distance to receive therebetween the axial leads of an element. A curved plate 21, connected to guide plates 20 and coacting with the lower portion of frame 19, serves as a magazine 22 to hold a supply of elements above the wrapping bits 8. A rotatable shaft 23, having a pair of toothed sprocket wheels 24 spaced from each other and rotatable with said shaft, is journaled in said frame for stripping the components from the tape. The adhesive tape passes over the shaft 23 to, and is wound upon, the take-up reel 25. The take-up reel is driven by a belt 26 from the shaft 23. As the tape passes over shaft 23 the elements attached thereto are held between the guide plates 20 and the frame 19 so that the tape is detached from the elements. The toothed sprockets 24 serve as an escapement to permit one element at a time to pass into the lower magazine 22. Rotation of the shaft 23 and take-up reel 25 are controlled through the movement of a lever 27 and a one-way clutch, not shown. The lever 27 is biased in a clockwise direction by a torsion spring 27a (as viewed in FIGS. 5 and 6), and is actuated by the return movement of the transfer mechanism 4, to be hereafter described, so that one element is released from the adhesive tape and permitted to fall by gravity to the magazine 22 above the wrapping tools after each operating cycle of the machine.

It will be obvious that without the feed mechanism above described, loose elements may be manually fed into the magazine 22 for semi-automatic wiring of the elements.

Transfer Mechanism

The purpose of the transfer mechanism is to convey one element at a time from the magazine 22 to the wrapping tools 2. This mechanism is located between the wrapping bits 8 and consists of an arm 29 pivotally connected, near one end thereof, to the movable platform 7 for movement in a vertical plane against the bias of a compression spring 30 in the platform 7. Movement of the arm 29 vertically upward is limited by an adjustable screw 31 in platform 7, rearwardly of its pivot point. The free end of the arm 29 has connected thereto a pair of spaced jaws 32 comprising one half of a gripping element. A second arm or lever 33 is pivotally connected to arm 29 approximately midway of its length. The lever 33 has a projection extending from a point intermediate the ends thereof at right angles thereto. A pair of spaced jaws 34, constituting the second half of the gripping element, are attached to said projection to coact with the jaws 32. The jaws 32 and 34 of the gripping element serve to grasp and hold the projecting leads of an electrical element.

Figure 5:
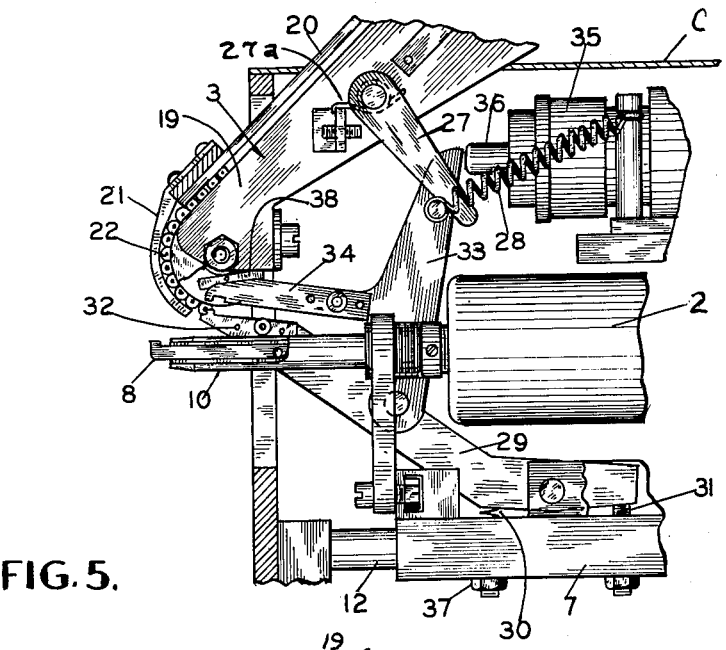
FIG. 5 is a view of the forward end of the machine of FIG. 1 showing the gripping jaws receiving an electrical element from the magazine.
Figure 6:
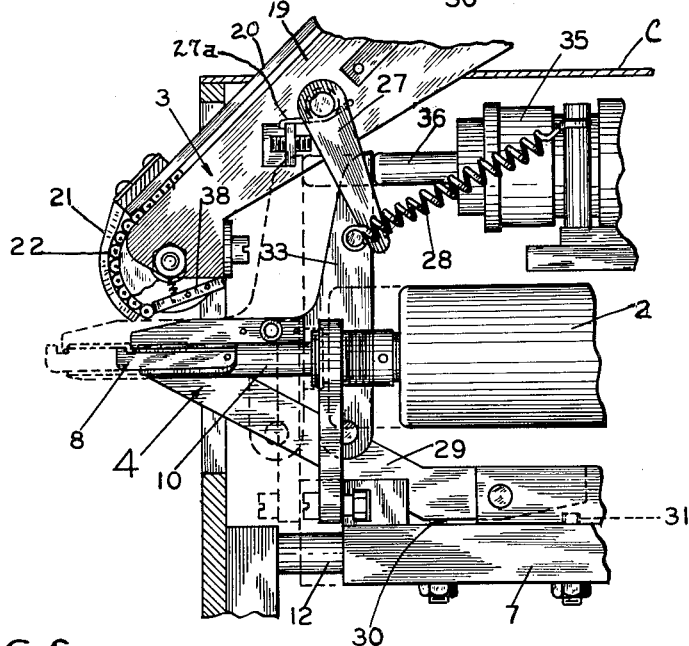
FIG. 6 is a view similar to FIG. 5 and showing the forward end of the machine as the wrapping tools are loaded and advanced to engage a work piece.

The transfer mechanism is actuated by a pneumatic cylinder 35 mounted on the platform 7 and having a stem 36 projecting therefrom and carried by a movable piston within the cylinder 35. Upon the admission of fluid pressure to the cylinder 35, stem 36 moves out of the cylinder and engages a free end of lever 33 which pivots with relation to arm 29 to close the jaws 32 and 34 upon the axial leads of an element fed through magazine 22 (FIG. 5). Further motion of stem 36 causes lever 33 and arm 29 to move arcuately as a unit about the pivot point of arm 29, at the platform 7, to place the leads of the element on the bits 8 of wrapping tools 2 (FIG. 6). The jaws 32 and 34 hold the element while the sleeves 10 move axially forward over the bits 8 to load the leads in the bits, while the platform 7 moves forward to position the tools over the terminals, and while the leads are being wrapped upon the terminals of a work piece. Thus any stress on the body of the element during the wrapping operation is eliminated because of the holding action of the jaws 32 and 34. By adjusting the positioning screw 31 and spring 30, in front of the pivot point of the lower arm 29, jaws 32 and 34 may transport the element below the centerline of the bits 8 so as to put a strain relieving bend in the element leads before they are loaded in the wrapping tools (FIG. 7).

After the wrapping operation is completed, the supply of fluid to cylinder 35 is interrupted permitting springs 28 and 30 to open the jaws 32 and 34. Slightly afterwards the supply of fluid pressure to cylinder 13 is interrupted and springs 14a return the platform 7 to its original position. As the platform returns and the tension springs 28 coact with spring 30 to return the arm 29 and lever 33 to their original positions, the upper jaws 34 engage a spring biased escapement arm 38 (FIGS. 5 and 6), which is pivotally connected to frame 19, to release a single element from the magazine 22 onto the lower jaws 32, in position for the transfer movement to the wrapping tools during the next cycle of operation of the machine. Also, during the return movement of the platform 7, the lever 33 engages the lever 27 moving it counter-clockwise (as viewed in FIGS. 5 and 6), against the bias of spring 27a. This movement of lever 27 rotates the toothed sprockets 24, by means of the one-way clutch, to release a single element from a reel pack 17 into the magazine 22.

It will be apparent that in some applications of this machine the component feed and transfer mechanisms may be omitted and a wire feed mechanism may be used to direct a predetermined length of wire from a supply to the tools 2. Such a mechanism could be mounted at one side of the machine and arranged to place a length of wire horizontally across the bits 8 of the tools, whereupon the wire would be cutoff and the machine operated as hereinafter described.

Work Piece Feeding Mechanism

The fixture 5 on the illustrative embodiment of this invention consists of a spacer web 39 fastened to the base 1 of the wiring machine. A pair of parallel vertical tracks 40 project upwardly from the fixture 5. The tracks 40 are each provided with a longitudinal groove to slidably receive therebetween a terminal board 41 of the type having terminals 42 evenly spaced thereon and projecting therefrom towards the wrapping tools 2. As shown, the terminals 42 also project rearwardly through the opposite side of the terminal board for a purpose to be explained hereafter. An escapement mechanism generally indicated as 43 connected to the fixture 5 serves to control the movement of the terminal board 41 for each cycle of operation of the machine. The escapement mechanism 43 comprises a member 44 pivotally mounted on a horizontal pin 45 carried by the fixture with a pivotal connection to a reciprocable shaft 46 of a standard solenoid 47. Upper and lower T-shaped plates 48 connected to the member 44 engage the rearward projections of the terminals 42 to hold the terminal board 41 in position for an element to be wrapped on the terminals. After the wrapping operation is completed the solenoid 47 is actuated pivoting member 44 about the pin 45 and allowing terminal board 41 to drop by gravity providing step-by-step indexing of each pair of terminals into position for wrapping an element thereon. The fixture 5 may be designed in many forms to accommodate and feed a variety of work pieces on which electrical elements are to be wrapped.

Control Mechanism

The operation of the various functions and elements of the machine is controlled by the cam means 6 comprising a plurality of cams 49, 50, 51, 52 and 53 on a shaft 54 rotated by an electric motor 55. Electric switches 56, 57, 58, 59 and 60 are sequentially operated as the cams 49–53 are rotated. A supply of electric energy is furnished to the machine by a lead-in 61 connected to a source of electricity. Fluid pressure for the operation of the wrapping tools and air cylinders heretofore described is supplied to the machine by an air hose 62 from a source of pressure fluid, not shown.

FIG. 8 diagrammatically represents the control circuit. The cams 49–53 are rotated by motor 55 to sequentially actuate the switches 56–59 which are connected to solenoid type air valves 63, 64, 65 and 66 which are commercially available items. By this arrangement cam 49 actuates valve 63 to admit air to cylinder 35 to operate arm 29 and lever 33 to transfer an element from the magazine 22 to the wrapping tools 2 as heretofore described. Valve 64 is then operated by cam 50 to admit air effective upon pistons 11 in the wrapping tools 2 causing sleeves 10 to advance on the bits 8 to position the wire leads of the element on the bits preparatory to the wrapping operation itself. Then cam 51 causes valve 65 to open admitting air to cylinder 13 to advance the platform 7 thereby positioning the wrapping tools over the terminals 42, the terminal board having been previously inserted between the tracks 40 of fixture 5. Valve 66 is then opened by the action of cam 52 admitting fluid pressure to the rotary motors in cylinders 9 of wrapping tools 2 to rotate the bits and perform the wrapping operation. Valves 63, 64 and 65 are three-way valves providing a vent to atmosphere when the flow of air pressure to cylinders 35 and 13 and to pistons 11 is interrupted. Valve 66 is a two-way valve as the cylinders 9 in which the rotary motors are housed exhaust to atmosphere. At the completion of the wrapping operation the cams 49, and 52 cause valves 63 and 66 to close shutting off the supply of air to the rotary motors of the wrapping tools 2 and allowing lever 33 and arm 29 to return to their original positions. Cams 50 and 51 then cause valves 64 and 65 to close causing sleeves 10 to retract with respect to wrapping spindles 8 and allowing platform 7 to return to its original position. During the return movement of platform 7 lever 33 engages lever 27 turning sprocket 23 to release another element to magazine 22 as heretofore described. The jaws 34 also engage the escapement arm 38 to release an element from the magazine 22 on to the jaws 32 in position for the next cycle of the machine. The fifth cam 53 then closes and opens the circuit to solenoid 47 to index the terminal board 41 for the next wrapping cycle of the machine. Further rotation of the cams 49–53 by motor 55 causes the described cycle to be repeated until operation of the machine is stopped.

The solenoid 47, switches 56–59, valves 63–66 air cylinders 13 and 35 and electric motor 55 are commercially available in varying forms and models. Further, various pneumatic and electrical devices may be used to control the operation of the type of machine herein described. Therefore, the specific control and actuating elements shown herein are for purposes of illustration and it is not intended that the scope of this invention be limited thereby.

It will also be obvious to those skilled in the art of machine design and control circuitry that the invention described herein lends itself to a wide variety of variations and modifications falling within the scope of the claims appended hereto.

In the following claims the terms "electrical elements" and "axial lead type electrical elements" are used for convenience to describe the type of electrical components which the machine herein described connects to the terminals of a work piece. It is intended that these terms include resistors, diodes, capacitors and similar axial lead type components as well as pre-cut lengths of wire either of the uninsulated type or insulated lengths of wire having the end portions thereof stripped of insulation.

We claim as our invention:

1. In a machine for connecting wires to terminals including a pair of wrapping tools mounted on a movable platform carried on a stationary base; a magazine connected to said base and adapted to receive a plurality of axial lead type electrical elements, said magazine having escapement means to release a single element therefrom; transfer means comprising a first arm pivotally connected to said platform, a second arm pivotally connected to said first arm, said first and second arms having coacting jaws arranged to grip an element released by said escapement means; and means for moving said second arm with respect to said first arm to close said jaws and for moving said second and first arms arcuately with respect to said platform to position an element carried by said jaws in engagement with said wrapping tools.

2. A machine for connecting wires to terminals comprising: a base; a platform movable relative to said base; means for moving said platform; wire wrapping tools mounted on said platform; said tools having bits with wire loading means for gripping a wire; an arm mounted on said platform and associated with said tools, having a jaw for receiving and supporting a wire adjacent to said bits in position to be gripped by said bits; a movable jaw arm cooperating with said first named arm to rigidly clamp said wire; and said arms being movable with said tools to support said wire as it is wrapped on the terminals.

3. A machine for connecting wires to terminals comprising: a base; a platform movable relative to said base; means for moving said platform; wire wrapping tools mounted on said platform; said tools having rotatable bits and longitudinally movable sleeves for gripping wire in said bits; jaw arms associated with said tools and pivotally mounted on said platform; said jaw arms adapted to receive a wire; means for actuating said jaw arms to clamp said wire and to carry said wire into engagement with said bits to be gripped by said bits; and said jaw arms being movable with said tools to carry said wire to the terminals to be wrapped on the terminals.

4. A machine for connecting wires to terminals comprising: a base; a magazine on said base having a mechanism for releasing wires singly therefrom; a platform movable with respect to said base; wire wrapping tools mounted on said platform having bits with wire loading means; jaw members pivotally mounted on said platform; said jaw members being movable between first and second positions; said jaw members, in the first position, being open and positioned to receive a wire from said magazine; said jaw members, in the second position, being closed to clamp said wire and hold said wire in engagement with said bits; operating means for sequentially moving said jaw members from said first to said second position, actuating said wire loading means, advancing said platform to move said tools to wrapping position, actuating said tool bits, and returning said elements to their original positions; and said jaw members engaging and actuating said magazine release mechanism when moving to said first position to release a wire from said magazine to said jaw members.

5. A machine as set forth in claim 4 wherein said jaw members are adjustable with respect to said platform to position a wire with respect to said tool bits to place a strain relieving bend in said wire between said jaw members and said bits.

6. A machine for connecting wires to terminals comprising: a base; a magazine having a release mechanism for releasing wires singly therefrom; a platform mounted for sliding movement on said base; means biasing said platform to a rearward position; a pair of wire wrapping tools mounted on said platform; said tools having rotatable bits with terminal receiving recesses at one end and longitudinally movable sleeves for loading wire in said bits; a first arm mounted for limited pivotal movement with respect to said platform and having a lower jaw; a second arm pivotally mounted on said first arm and having an upper jaw; means biasing said arms to first positions wherein said jaws are open and wherein said lower jaw is positioned adjacent to said magazine to receive a wire therefrom; control means for sequentially moving said arms to a second position wherein a wire is clamped in said jaws and held in engagement with said tool bits, actuating said sleeves to load the wire in said bits, advancing said platform to a forward position to move said tools into wrapping position with respect to the terminals, rotating the bits to wrap the wire on the terminals, and for returning said arms, said sleeves, and said platform to their original positions; said jaws clamping the wire until the wire is wrapped on the terminals; and said second arm being disposed to engage and actuate said magazine release mechanism, when said arm returns to its first position, to release a wire to said lower jaw.

7. In a machine for connecting wires to terminals including a base, a platform mounted for rectilinear movement with respect to said base, and a pair of wire wrapping tools mounted on said platform, said tools including wire wrapping bits having wire loading means: a magazine mounted on said base having a release mechanism for releasing wires singly therefrom; a first arm pivotally mounted adjacent one end, on said platform for limited pivotal movement, the other end of said arm defining a lower jaw; a second arm, pivotally mounted on said first arm, defining an upper jaw; means biasing said arms to first positions, with respect to said platform, wherein said jaws are open and wherein said lower jaw is positioned adjacent to said magazine to receive a wire therefrom; said second arm disposed to engage and actuate said release mechanism when it is moved to its first position; and means mounted on said platform for moving said arms to second positions to clamp a wire received in said lower jaw and to carry said wire to said wrapping bits; said jaws securely holding the wire during a wrapping operation by said bits.

References Cited in the file of this patent

UNITED STATES PATENTS

| | | |
|---|---|---|
| 663,694 | Chilton | Dec. 11, 1900 |
| 2,497,899 | Monson | Feb. 21, 1950 |
| 2,593,801 | Sauer | Apr. 22, 1952 |
| 2,746,124 | Belek | May 22, 1956 |
| 2,772,416 | Dorosz et al. | Dec. 4, 1956 |
| 2,854,054 | Gross | Sept. 30, 1958 |
| 2,855,159 | Mallina | Oct. 7, 1958 |
| 2,862,670 | Mallina | Dec. 2, 1958 |
| 2,862,671 | Dimond | Dec. 2, 1958 |
| 2,873,513 | Carlzen et al. | Feb. 17, 1959 |